United States Patent [19]

McClenahan et al.

[11] Patent Number: 5,519,489

[45] Date of Patent: May 21, 1996

[54] VEHICLE ALIGNMENT SYSTEM

[75] Inventors: James W. McClenahan, Florissant, Mo.; Leigh R. Burns, Troy, Ill.; Michael T. Stieff, Wentzville, Mo.

[73] Assignee: Hunter Engineering Company, Bridgeton, Mo.

[21] Appl. No.: 339,461

[22] Filed: Nov. 18, 1994

Related U.S. Application Data

[63] Continuation-in-part of Ser. No. 162,452, Dec. 2, 1993.

[51] Int. Cl.$^6$ .............................. G01B 11/26; G01B 5/24; G01C 3/00
[52] U.S. Cl. .................... 356/139.09; 33/203.15; 33/203.18; 33/288; 356/3.12; 356/4.03
[58] Field of Search ............................. 356/139.09, 141.3, 356/155, 141.1, 4, 152.1, 1, 3.10, 3.11, 3.12, 4.03; 33/288, 203.15, 203.18

[56] References Cited

U.S. PATENT DOCUMENTS

| | | | |
|---|---|---|---|
| 4,154,531 | 5/1979 | Roberts et al. | 356/155 |
| 4,257,703 | 3/1981 | Goodrich | 356/4.03 |
| 4,302,104 | 11/1981 | Hunter . | |
| 4,311,386 | 1/1982 | Coetsier . | |
| 4,319,838 | 3/1982 | Grossman et al. | 33/288 |
| 4,336,658 | 6/1982 | January et al. | 33/288 |
| 5,018,853 | 5/1991 | Hechel et al. | 33/288 |
| 5,168,632 | 12/1992 | Rimlinger, Jr. | 33/288 |
| 5,208,647 | 5/1993 | Longa et al. | 356/139.09 |

*Primary Examiner*—Stephen C. Buczinski
*Attorney, Agent, or Firm*—Polster, Lieder, Woodruff & Lucchesi

[57] ABSTRACT

An improved vehicle alignment system includes automatic angle and distance range calibration whereby various vehicle distances such as track width and wheelbase may be measured electro-optically during the alignment process. The system also includes an improved process which results in shorter measurement cycles for the sensors by utilizing an electronic shutter control. The sensors work in pairs, and a novel synchronization scheme is used to ensure that the emitters of one sensor are not radiating at the same time the emitters of the other sensor of that pair are radiating and to determine which emitter of the pair corresponding to a sensor is radiating. Reflections of the emitters from nearby surfaces are discriminated from direct transmissions so that the angle of incidence is accurately determined. Moreover, determination of the angle of incidence is simplified by use of a lens whose image position varies in a specific manner as the imaged object moves radially away from the axis of the lens. The present system is particularly suited for measuring difficult alignment measurements such as toe-out on turns electro-optically with a minimal number of sensors.

15 Claims, 8 Drawing Sheets

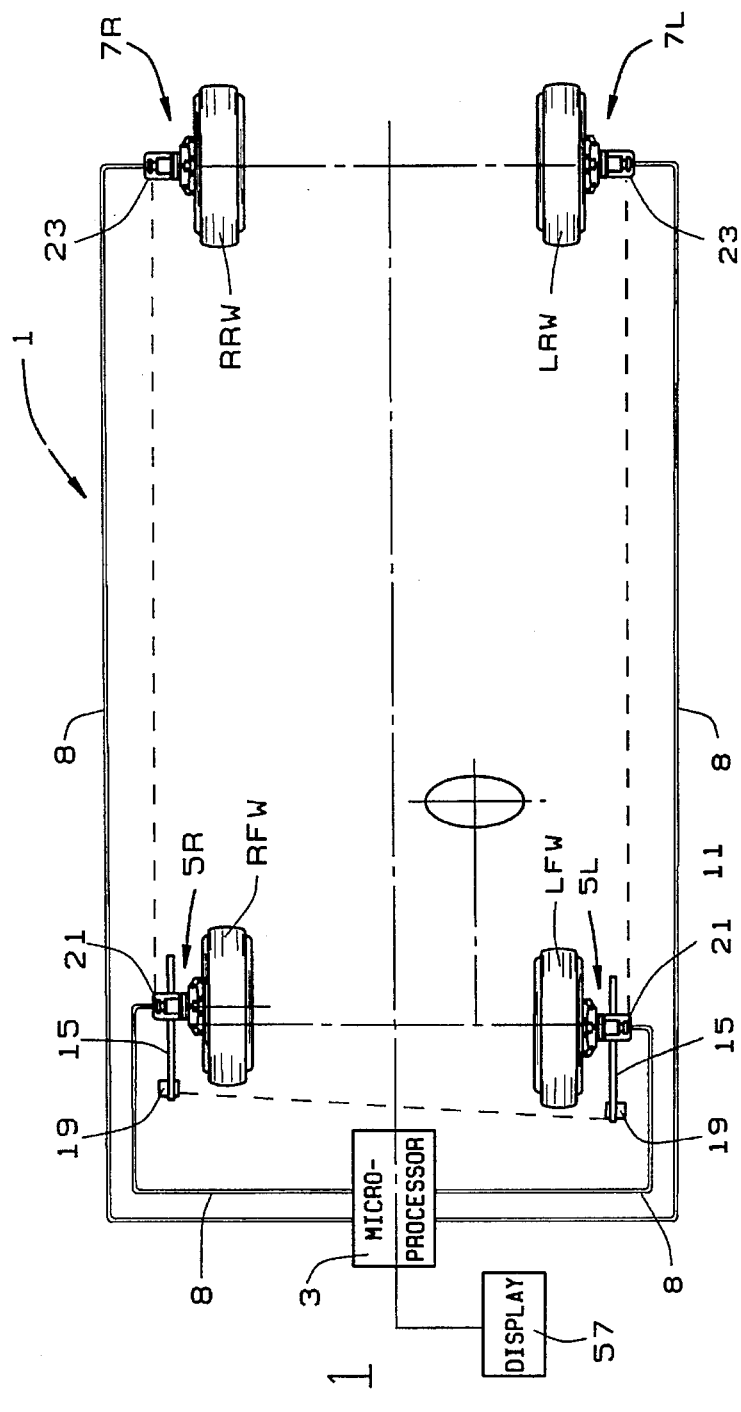
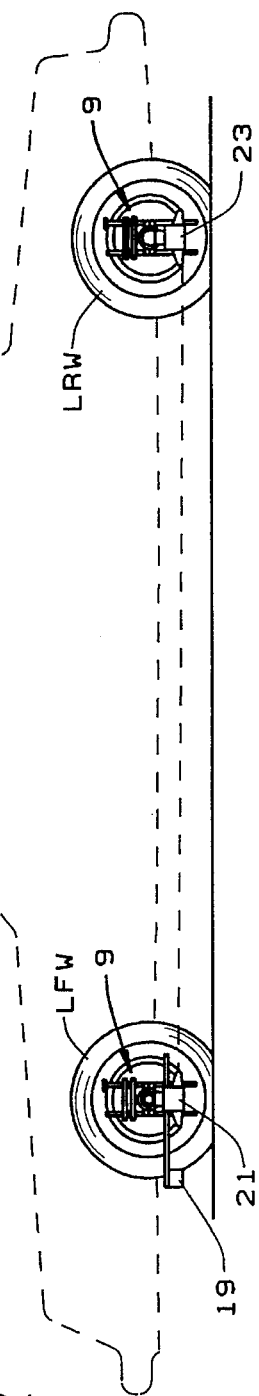
FIG. 1
FIG. 2

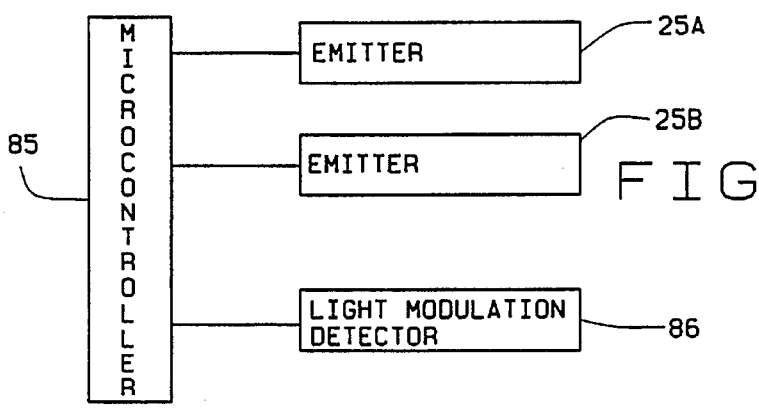
FIG. 18
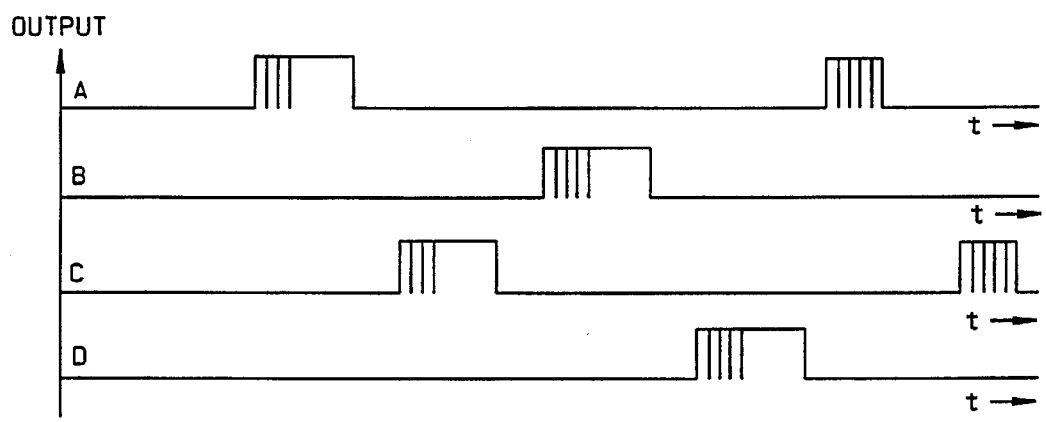
FIG. 19
FIG. 20A
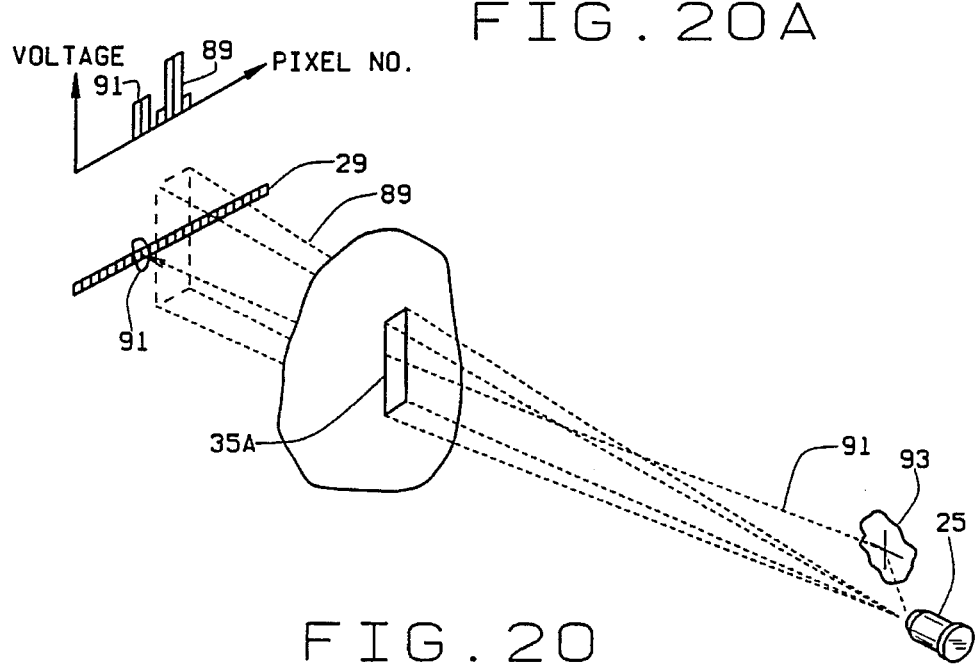
FIG. 20

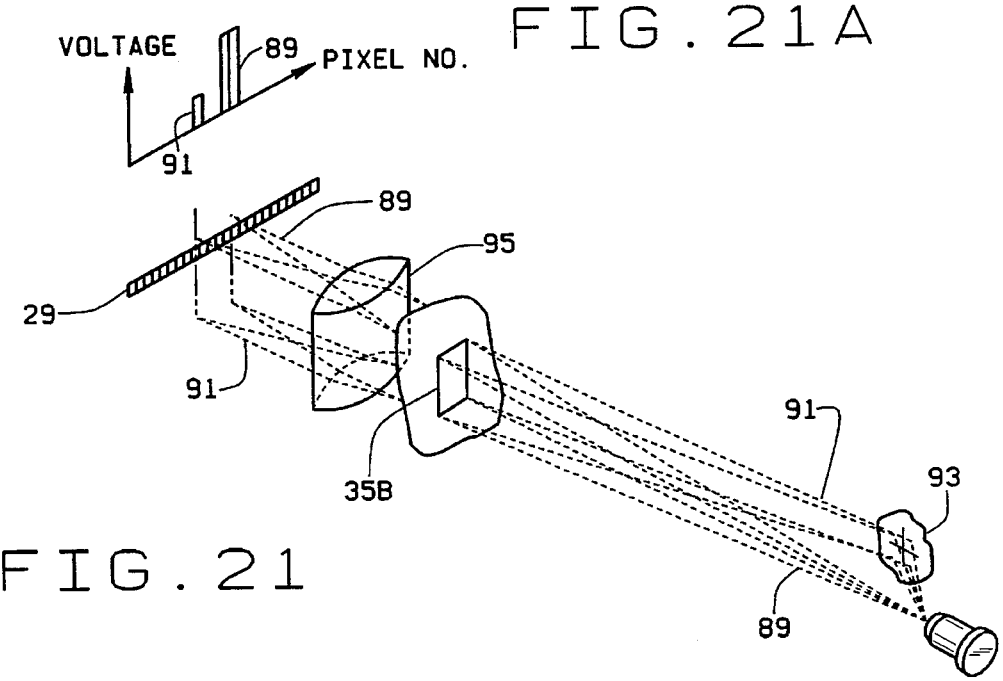
FIG. 21A
FIG. 21
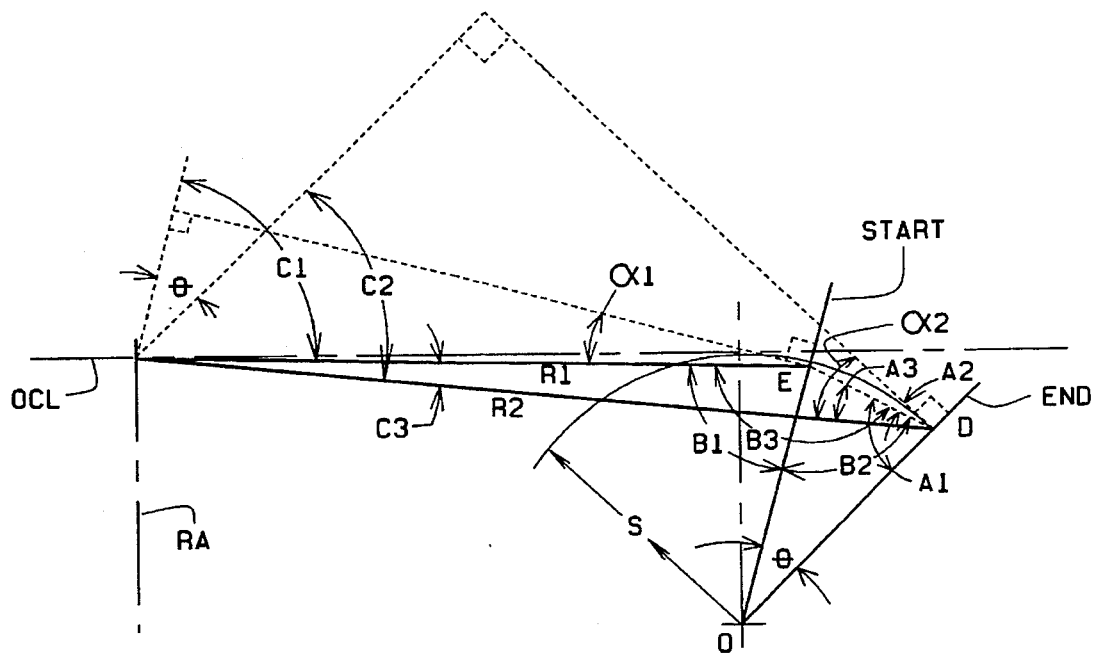
FIG. 22

VEHICLE ALIGNMENT SYSTEM

REFERENCE TO RELATED APPLICATION

This is a continuation-in-part of copending application Ser. No. 08/162,452, filed on Dec. 2, 1993.

BACKGROUND OF THE INVENTION

This invention relates to vehicle wheel alignment systems, and in particular to an sensors in a vehicle wheel alignment system which include an active pixel array detector such as a charge coupled device (CCD) array.

Proper alignment of wheels in a vehicle is imposer for proper handling of the vehicle and proper tire wear. The alignment of a vehicle's wheels is performed primarily by adjusting camber, caster, steering axis inclination (SAI) and toe. Other suspension problems may be detected by examining vehicle ride height (a measure of vertical vehicle body position with respect to some reference such as the ground or a vehicle wheel) and wheel offset distances (a measure of relative horizontal vehicle body position with respect to the vehicle wheels). Some of these alignment measurements may also require determination of vehicle distances such as wheelbase and track width. Unfortunately, many of these measurements are not easily performed using conventional alignment systems.

It is known that alignment angles may be measured by placing sensor heads on each wheel of the vehicle to form pairs which extend across the front and/or rear of the vehicle and along each side of the vehicle. Each sensor head typically has an emitter and a receiver. In the prior art systems a sensor head emits a signal which is transmitted to the receiver of the other sensor head of that pair. The receiver conveys this signal into a value which is indicative of the measured angle. The signal presently used in these sensor heads is an electromagnetic signal in the visual or infrared range (hereinafter, referred to as light). The light impinges upon a sensing device in the receiver whose output is representative of the measured angle.

Currently, photodiodes, as set forth in U.S. Pat. No. 4,302,104, which is incorporated herein by reference, and linear array type charge coupled devices (CCDs), as set forth in U.S. Pat. No. 5,018,853, are used as the receiver. Each of these devices has inherent limiting factors which affect their suitability for use as detectors in a vehicle wheel alignment system.

The photodiode array has a number of large active areas arranged in a linear array. The incident angle of the light beam is determined by taking the ratio of signals on two adjacent elements of the array. Because the elements are large, the aperture opening typically has a correspondingly large area. It should be understood that the size and placement of the aperture in these systems involves a compromise. If the photodiode elements are large and the slit or aperture is close to it, the system will be able to measure a wide angular range, but the resolution will be lowered. On the other hand, if the diode is small and the slit is far away, the resolution will be high but the angular range will be small. Under certain conditions, diffuse and/or reflected beams can enter the sensor and bias the angular readings. This occurs when a reflected beam and the directly radiated beam are co-incident on the array, but their energies are centered at different points. The reflection cannot be identified (and thereby rejected) by the electronics because the large photodiode uses all the energy that is incident upon it (direct and reflected) to produce a signal. Because the reflection cannot be eliminated, a false reading, and hence a wrong angle, will be produced.

The CCD array incorporates many more active elements than the diode array, and those elements are much smaller than the diode array elements. As a result, spatial resolution with a CCD array is greatly enhanced and reflected beams that are co-incident in time but not position with the main beam can be identified and separated before the angle is determined. Problems can still be caused, however, by reflected signals if they are large in amplitude and impinge close to the main beam.

Although alignment sensors are quite accurate, it should be understood that there is some variation in response from sensor to sensor caused in part by variations in mechanical construction. It would be desirable to compensate for this variation by automatically range calibrating the sensors initially so that subsequent measurements would be uniform. In addition, it would be desirable to reduce the cycle time between measurements for current sensors. Many CCD arrays, for example, have an undesirably long minimum cycle time which is dependent upon the read out cycle time of the sensor. In addition all current sensors are believed to be affected by ambient light sources which interfere with the functioning of the sensors. To compensate for this effect, some sensors expose the image array twice: once with the light source on to measure the angle in question, and once with the light source off to determine the ambient light levels. The difference of the two readings shows only the desired light source. This procedure, however, requires two exposures, which further degrades the total cycle time of the sensor.

It has been found that the performance of vehicle alignment sensors can be improved by using a pair of light sources for each detector, but this requires determining the actual angle from the pair of resulting images on the sensor. Since the sensors are used in pairs, it is also desirable to synchronize the operation of the sensors so that the light from both emitters of a sensor pair is not radiated at the same time.

In order to define the measured angle accurately, the prior art devices have used various means such as narrow slits, or long exposure times to define the image. A narrow slit interposed between the radiation source and the detector array provides a satisfactory image, but it significantly reduces the amount of energy reaching the detector array. A very high intensity radiation source (or the aforementioned long exposure times) can be used to compensate for the effect of the narrow slit, but that is also undesirable. Moreover, even when adequate radiation is available and the image is sharp, the relationship between the position of the image and the angle being measured is not linear except for small angular variations from normal incidence. Off-axis angles of incidence may be determined accurately from the detector output only by mathematical manipulation of the detector output, which slows down the response of the system and also complicates the range calibration of the system.

Conventional alignment systems are not optimally suited to make various desirable alignment measurements. One example is measurement of toe out on turns (hereinafter "TOOT"). In order to minimize tire wear and enhance directional stability, the front wheels of a vehicle turn at slightly different angles when negotiating a turn. The ideal angles are determined by the vehicle manufacturer and are largely dependent on wheelbase, track width and the radius of the turn. Many vehicles have these angles specified at twenty (20) degrees of turn. Some manufacturers specify setting the inside wheel at twenty (20) degrees and measuring the toe of the outside wheel, while others specify the outside wheel at twenty (20) degrees and measure the toe of the inside wheel. In either case there is a nominal angle that is to be achieved by each wheel. Most available aligners do not have the angular range necessary to measure twenty (20) degrees of turn by purely electro-optical means. Various mechanical expedients are used instead. For example, the assignee of the present application makes a kit for this purpose consisting of angle encoders and elastic strings. A string is connected between the encoders in the front and rear sensors and the total angle of turn is computed by subtracting the rear encoder reading from the front encoder reading. While this method works, it has relatively low resolution and the additional disadvantage of the physical attachment of the strings. Alternatively, the steered angle may be measured by an angle sensing turn plate, a completely separate piece of equipment. The turn plate sits under the desired front wheel and pivots with the wheel as it turns. Such systems are not accurate enough if there is any slippage between the tire and the turn plate (which is often the case if the turn plate is not well centered on the tire).

It would be desirable to measure the steered angle of the proper front wheel using electro-optical means, but that approach also has drawbacks. These arise from the fact that such a conventional system would require the front and rear sensor on the proper side of the vehicle to "see" each other simultaneously over an angular range of at least twenty (20) degrees. This is impractical because many currently available emitters do not have sufficient radiation intensity over such a wide emission angle. In addition, if the emitter beam is not confined to an approximately five (5) degree cone, there may be undesirable reflections occurring due to the proximity of vehicle body and chassis parts. If the reflections are severe, they could render the system inoperative. With the five (5) degree emitter cone restriction, the rear sensor in a conventional system will loose sight of the front sensor emitters as soon as the front wheel turn angle or steered angle exceeds five (5) degrees. However, the front sensor can see the rear emitter(s) and calculate angles all the way to twenty (20) degrees of turn (since the detector on the front wheel remains in the five degree cone of light from the rear emitter throughout). Unfortunately, using only the angle from the front sensor results in erroneous readings because the front sensor itself is swinging through space at the end of an arc which is centered on the steering axis. The translation due to the swing is interpreted as an additional angle by the sensor.

SUMMARY OF THE INVENTION

Among the various objects and features of the present invention may be noted the provision of a vehicle alignment system with improved detection and determination of alignment and suspension measurements.

A second object is to provide such a system which includes automatic angular and distance range calibration.

A third object is to provide such a system with an improved exposure time.

A fourth object is to provide such a system which ensures that the emitters of one sensor are not radiating at the same time the emitters of the other sensor of that pair are radiating.

A fifth object is to provide such a system with improved discrimination of signals caused by reflections.

A sixth object is to provide such a system in which determination of the angle of incidence of radiation on the sensor is simplified while the intensity of the radiation falling on the sensor is improved.

A seventh object is to provide a system in which difficult measurements such as toe-out on turns are accurately and readily accomplished electro-optically with a minimal number of sensors.

These and other objects will become apparent to those skilled in the art in light of the following disclosure and accompanying drawings.

Briefly, in a first aspect of the present invention, a method of electronically determining distances in connection with servicing of a vehicle includes a method of calibration. A sensor is fixed at a first known distance from a pair of radiation sources, which pair of radiation sources are separated by a second known distance from each other, and which sensor has an image detector mounted a fixed distance behind an image forming element. Images from the pair of radiation sources are caused to fall upon the image detector, the spatial separation on the image detector of the images created by the pair of radiation sources is measured, and a calibration factor for the sensor is determined from the spatial separation and the known first and second distances.

In a second aspect of the present invention, a vehicle wheel aligner includes a first unit for attachment to a first wheel of a vehicle, a second unit for attachment to a second wheel of a vehicle, a radiation source mounted on the first unit for providing a radiation signal, and an image detector mounted on the second unit for receiving an image from the radiation source and for producing an output in response to the radiation signal. The image detector includes a pixel array, the pixels in the array accumulating charge in response to radiation from the radiation source falling thereon. The image detector is a CCD detector with electronic shutter control. The charges in the pixels of the array are read to form a numerical representation of the radiation falling on the pixel array. Circuitry is provides for electronically discharging the pixel array to commence an exposure cycle. A controller analyzes the numerical representation of the radiation falling on the pixel array to determine vehicle alignment information for the vehicle.

In a third aspect of the present invention, a vehicle wheel aligner includes a first unit for attachment to a first wheel of a vehicle, a second unit for attachment to a second wheel of a vehicle, a radiation source mounted on the :first unit for providing a radiation signal, and an image detector mounted on the second unit for receiving an image from the radiation source and for producing an output in response to the radiation signal. The image detector includes a pixel array, the pixels in the array accumulating charge in response to radiation from the radiation source falling thereon. The image detector has an exposure time and a readout time, the exposure time being less than the readout time. A filter is disposed adjacent to the image detector to filter out ambient radiation at frequencies other than those of the radiation signal. The charges in the pixels of the array are read to form a numerical :representation of the radiation falling on the pixel array. A controller controls the exposure time of the image detector to minimize the effects of ambient light and analyzes the numerical representation of the radiation falling on the pixel array to determine vehicle alignment information for the vehicle.

In a fourth aspect of the present invention, a vehicle wheel aligner includes a first unit for attachment to a first wheel of a vehicle, a second unit for attachment to a second wheel of a vehicle, at least a pair of radiation sources mounted on the first unit for providing a pair of radiation signals, and an image detector mounted on the second unit for receiving an image from the radiation sources and for producing an output in response to the radiation signal. The image has a pair of peaks corresponding to the pair of radiation sources, and the image detector includes a pixel array, the pixels in the array accumulating charge in response to radiation from the radiation sources falling thereon. The charges in the pixels of the array are read to form a numerical representation of the radiation falling on the pixel array. A controller analyzes the numerical representation of the radiation falling on the pixel array to determine the true line of sight from the image detector to the radiation sources to determine vehicle alignment information for the vehicle.

In a fifth aspect of the present invention, a vehicle wheel aligner includes a first unit for attachment to a first wheel of a vehicle (which first unit includes a first pair of radiation emitters and a first modulation detector) and a second unit for attachment to a second wheel of a vehicle. The second unit includes a second pair of radiation emitters and a second modulation detector. The first modulation detector detects modulation in the radiation from the second pair of radiation emitters, and the second modulation detector detecting modulation in the radiation from the first pair of radiation emitters. A first image detector is mounted on the first unit for receiving an image from the radiation emitters of the second unit and a second image detector is mounted on the second unit for receiving an image from the radiation emitters of the first unit. A first synchronizing controller is operatively connected to the first modulation detector for synchronizing the output of the first pair of radiation emitters so that the first pair of radiation emitters emit radiation only during periods of time when the second pair of radiation emitters are not emitting radiation. A controller is responsive to the image received by at least one of the image detectors to determine vehicle alignment information for the vehicle.

In a sixth aspect of the present invention, a vehicle wheel aligner includes a radiation source adapted to be removably mounted to a first wheel of a vehicle, and an image detector adapted to be removably mounted to a second wheel of a vehicle. The image detector has a plurality of pixels for receiving radiation from the radiation source and generating a pixel-by-pixel representation of the image falling on the detector. An image generator including an aperture is disposed adjacent the image detector for defining an image of the radiation source on the image detector. A controller is operatively connected to the image detector for determining angles of incidence of radiation from the radiation source from the pixel-by-pixel representation of the image falling on the detector and determining vehicle alignment information therefrom. The controller is responsive to the pixel-by-pixel representation to distinguish between direct and reflected images of the radiation source and to determine the angle of incidence of the direct radiation from the radiation source independently of the reflected image.

In a seventh aspect of the present invention, a vehicle wheel aligner includes a radiation source adapted to be removably mounted to a first wheel of a vehicle and an image detector adapted to be removably mounted to a second wheel of a vehicle. The image detector has a plurality of pixels for receiving radiation from the radiation source and generating a pixel-by-pixel representation of the image falling on the detector. A mask including an aperture is disposed adjacent the image detector for defining an image of the radiation source on the image detector. A lens is disposed between the aperture and the image detector, the lens having a focal length which varies with distance from the axis of the lens. A controller is operatively connected to the image detector for determining angles of incidence of radiation from the radiation source from the pixel-by-pixel representation of the image falling on the detector and determining vehicle alignment information therefrom.

In an eighth aspect of the present invention, a vehicle wheel aligner includes a source of a pair of radiation images, the source being adapted to be removably mounted to a rear wheel of a vehicle. An image detector is adapted to be removably mounted to a front wheel of a vehicle, the front wheel being steerable to a desired steered angle. The image detector has a plurality of pixels for receiving radiation from the radiation source and generating a representation of the images falling on the detector. A controller is operatively connected to the image detector for determining toe of the front wheel and distance of the image detector from the source of images from the representation of the images falling on the detector at a first steered angle of the front wheel.

In a ninth aspect of the present invention, a method of electronically determining distance between a pair of sensors mounted on a vehicle includes the steps of projecting a pair of images upon an image detector, which images are separated such that the separation is a function of the distance between the pair of wheels, and electronically determining the separation of the images and calculating therefrom the distance between the pair of sensors.

BRIEF DESCRIPTION OF THE DRAWINGS

FIG. 1 is a schematic plan view of an alignment apparatus of the present invention applied to a vehicle's wheels;

FIG. 2 is a side elevational view of a vehicle, shown in phantom, having aligner head units applied to its wheels;

FIG. 18 is a block diagram illustrating synchronization control circuitry used in sensors of the present invention;

FIG. 19 is a graphical representation of the synchronization scheme used by circuitry such as that shown in FIG. 18;

FIG. 20 is a simplified perspective illustrating discrimination between direct and reflected beams using the present invention;

FIG. 20A is a graphical representation of the signals received using the structure shown in FIG. 20;

FIG. 21 is a view similar to FIG. 20 showing an alternative embodiment of such structure;

FIG. 21A is a graphical representation of the signals received using the structure shown in FIG. 21;

FIG. 22 illustrates the geometrical relationships used by the present invention in determining toe out on turns from sensor measurements of a single sensor.

Similar reference characters indicate similar parts throughout the several views of the drawings.

DESCRIPTION OF THE PREFERRED EMBODIMENT

Figure 10:
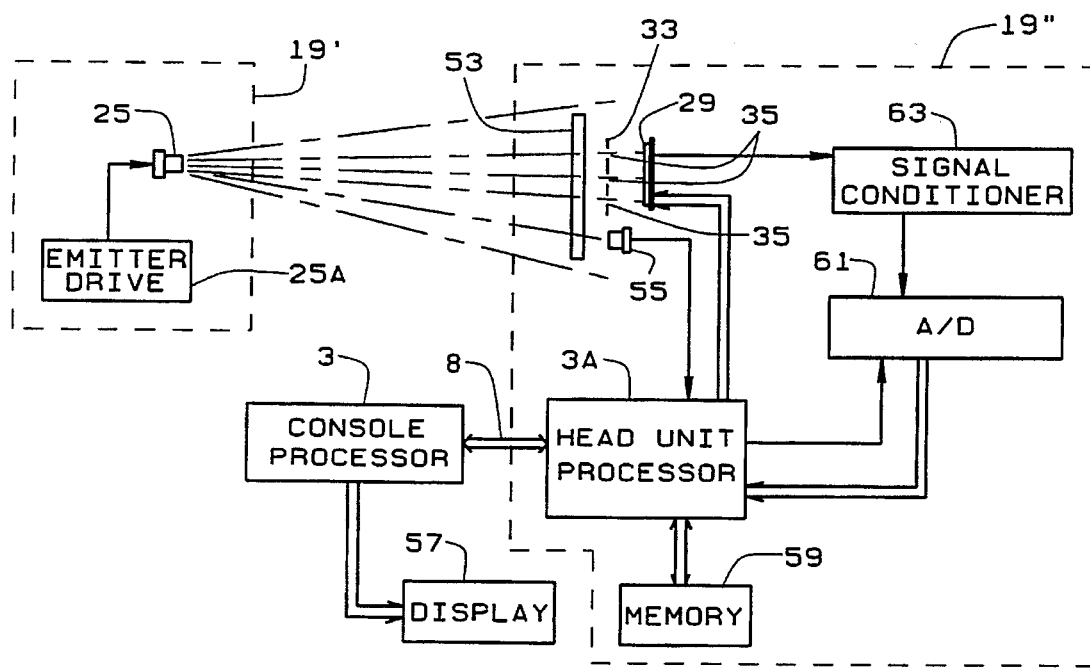
FIG. 10 is a block diagram of the circuitry of the alignment apparatus of FIG. 1.

Turning to FIG. 1, a wheel alignment system 1 of the present invention includes a main console having a microprocessor 3, left and right front head units 5L and 5R, and left and right rear head units 7L and 7R. Head units 5L and 5R and 7L and 7R are connected to microprocessor 3 by cables 8 or any other suitable communication channel such as radio or infrared. The head units are substantially similar to the head units described in U.S. Pat. No. 4,319,838 to Grossman et al., which is incorporated herein by reference. Although the head units are shown connected to an external microprocessor 3 or a digital signal processor (DSP), it is preferred that, as shown in FIG. 10, each head unit also include its own microprocessor or DSP. The head units are mounted to the left front wheel LFW, the right front wheel RFW, the left rear wheel LRW, and the right rear wheel RRW of a vehicle to measure the vehicle's alignment parameters. The head units are supported on the wheels by supports 9 (see FIG. 2).

Figure 3:
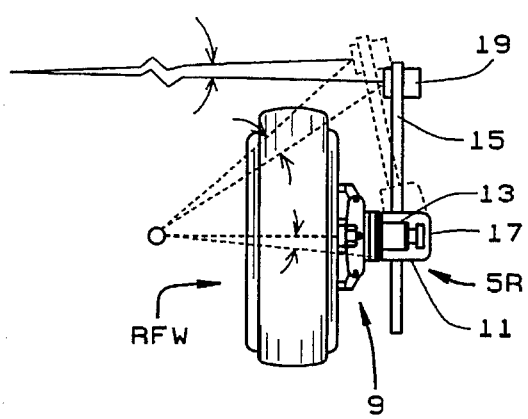
FIG. 3 is an enlarged plan view of a head unit applied to a steerable (front) wheel of the vehicle.

A front head unit is shown in more detail in FIG. 3. Each front head unit includes a housing 11, a sleeve 13 and an arm 15. (The rear head units are substantially similar to the front head units. The only significant difference is that the rear head units lack the arms 15 and transverse sensor 19.) Sleeve 13 mounts over a spindle of the corresponding support 9 to support the head unit. The head unit can swing freely about the spindle. The head unit can be positionally fixed by tightening a knob 17 of support 9. A level mounted on arm 15 indicates when the unit is horizontally level. Once the head unit is leveled, knob 17 is tightened to hold the head unit in its level position.

The front head units each include two sensor units 19 and 21 (see FIG. 1). Each rear head unit includes one sensor unit 23. Each sensor unit includes a signal emitter 25 and a receiver 27 (see FIG. 4), each receiver being operatively connected to microprocessor 3 via lines 8. As will become apparent, the emitters are not connected to microprocessor 3. The sensor units operate in pairs, as set forth fully in the above noted U.S. Pat. No. 4,319,838 to determine the alignment angles for the vehicle tested.

Figure 4:
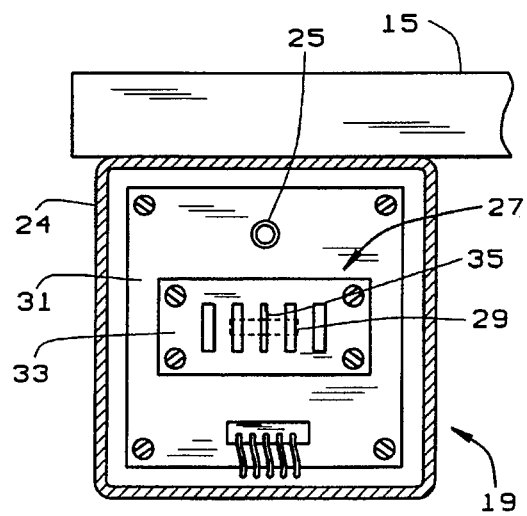
FIG. 4 is a front elevational view of an angle sensor of the present invention.
Figure 5:
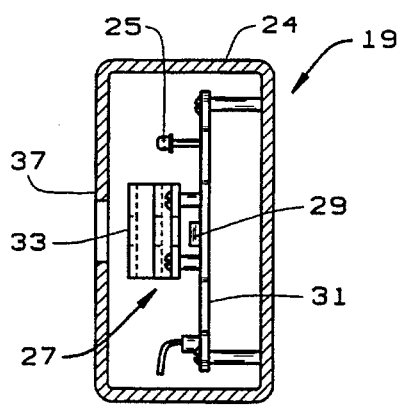
FIG. 5 is a side elevational view of the angle sensor.
Figure 6:
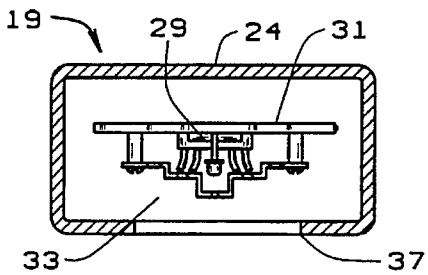
FIG. 6 is a top plan view of the angle sensor.

FIGS. 4–6 show a sensor unit in detail. Sensor units 19, 21, and 23 are identical and the sensor unit shown in FIGS. 4–6 has been indicated to be unit 19. Each sensor unit includes a housing 24 containing a signal source 25 and a signal receiver 27. Source 25 is preferably a light-emitting diode (LED).

Figure 7:
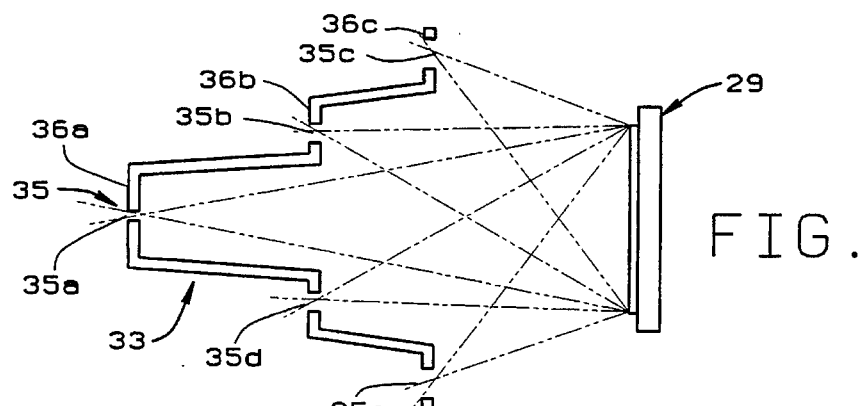
FIG. 7 is a cross-sectional view of a multiple slit mask of the present invention.

Receiver 27 includes a sensor 29 mounted on a PC board 31. Sensor 29 is an active pixel sensor, such as a CCD, a CID, a photodiode, a double-gate floating surface transistor, a charge modulation device (CMD), a bulk charge modulated device (BCMD), a static induction transistor (SIT), a base-stored image sensor (BASIS), or an infrared (IR) sensor. Because of its availability and high resolution, the sensor is preferably a CCD array. A mask 33 having one or more slits 35 is supported on PC board 31 spaced from CCD sensor 29. The mask is shown in FIG. 7 to have five slits 35a–e. Mask 33 defines three generally parallel planes or surfaces 36a–c on which slits 35a–e are formed. Surface 36a is furthest from CCD 29 and is centered with respect to CCD 29 and mask 33. Slit 35a is formed on surface 36a. Slits 35b and 35d are formed on surface 36b on opposite sides of slit 35a. Slits 35c and 35e are formed on surfaces 36c, again on opposite sides of slit 35a, and outwardly of slits 35b and d. The slits are preferably of varying widths: slit 35a is the narrowest and slits 35b–e progressively increase in size, slits 35c and 35e being the largest. However, any pattern of size increases can be used. Slits 35b–e are arranged symmetrically about slit 35a, in that the centers of slits 35b and 35d, and 35c and 35e are equidistant from the center of slit 35a. The center-to-center distance between slits 35c and 35e is greater than the center-to-center distance between slits 35b and 35d. The slits thus form a triangular pattern. The center slit is farthest from CCD 29 and the other slit pairs get farther apart as they get closer to the CCD. Although a mask with five slits is shown, any desired number of slits equal or greater than two could be used. A mask with three slits works well in the present invention. Moreover, the slits may be disposed on a rounded surface or a flat surface rather than the stepped surface shown in FIGS. 6 and 7. Although slits are described as the image forming elements, lenses could be used as well.

A window 37 (FIG. 6) is formed in a wall of housing 24 to allow light from the opposite emitter 25 to reach and pass through mask 33 to impact upon CCD sensor 29. Sensor 29 is mounted to PC board 31 so that its longitudinal axis is generally horizontal. Slit 35 is formed in mask 33 to be generally vertical so that the slit is generally perpendicular to CCD sensor 29. Slits 35 allow a portion of the light from opposite light source emitter 25 of the sensor's pair to fall upon CCD sensor 29. The remaining portion of the light from light source 29 directed at the sensor is blocked by mask 33.

CCD sensor 29 consists of a plurality of pixels. The pixels may be arranged linearly or in an XY array. When light from opposite light source emitter 25 impinges upon CCD sensor 29, the individual pixels, which are impinged by the light, are charged to create "charge packets." Readout is accomplished by transferring the charge packets to a register which is then read sequentially (the charges being shifted from position to position in a "bucket brigade" manner until all the pixels are read).

Figure 23:
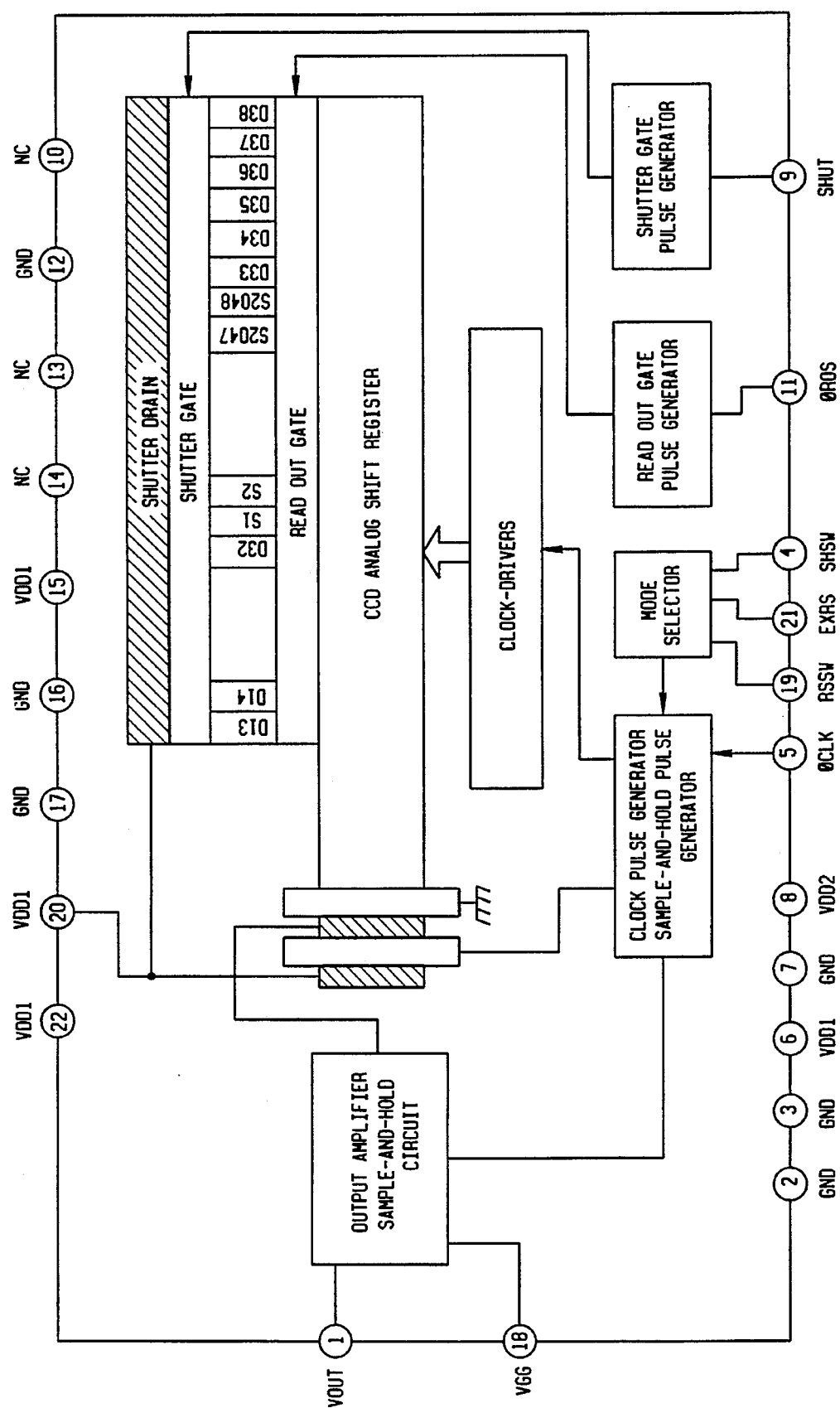
FIG. 23 is a block diagram of a CCD array with electronic shutter control for use in the present invention.

It is preferred that the CCD device contain an electronic shutter control. For example, the ILX703A device sold by Sony is such a device. For reference, a block schematic of the Sony CCD device with electronic shutter control is shown in FIG. 23. The specification sheet for the Sony ILX703A device is incorporated herein by reference. The electronic shutter control electronically discharges the accumulated charge on the CCD pixel array. The act of discharging the pixel array is essentially the beginning of the next exposure cycle. Devices without an electronic shutter control can only discharge the CCD pixel array as a part of a normal read out cycle. In those devices, the minimum exposure time is dependent upon the minimum read out cycle time. The electronic shutter control can be used to control the CCD exposure time independently of the read out cycle time, so that exposure times which are much less than the read out cycle time can be achieved.

Figure 8:
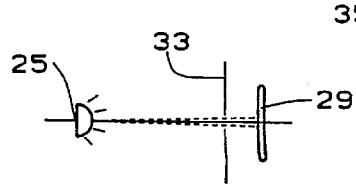
FIG. 8 is a diagram showing the angle of light entering the angle sensor for a vehicle having properly aligned wheels.
Figure 9:
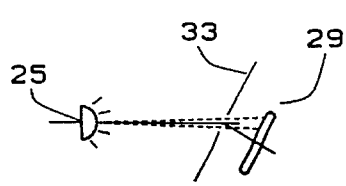
FIG. 9 is a diagram showing the angle of light entering the angle sensor for a vehicle having improperly aligned wheels.

FIG. 8 shows the relationship between light source 25 and sensor 29 at an angle of 0°. As can be seen, when the wheels are in alignment, the signal falls across the middle of sensor 29. FIG. 9 shows the relationship of light source 25 and sensor 29 when the wheels are not in proper alignment. As can be seen, when the wheels are not in alignment, the light signal does not fall across the middle of CCD sensor 29, but rather is displaced an amount corresponding to the angle to be measured.

When the receiving and transmitting heads are aligned, the energy passes through the central slit and impinges on the receiving array near the center. The energy passing through the adjacent slits would fall just outside the edges of the array. For small angles of movement about the aligned position, the energy coming through the central slit 35a would sweep along the array in proportion to the viewing angle of the head. Since the slit is a large distance from the array, a high resolution but limited range measurement can be achieved. When the viewing angle has exceeded the range of the central slit, the energy coming through an adjacent slit falls on the array. Measurements through this slit have an extended range with lower resolution. The number of slits, slit spacing, slit distanced from the sensor 29, and slit width can all be varied to achieve a desired range and resolution of an angular measurement.

As receiver 29 and emitter 25 are rotated relative to each other, the angle between receiver 29 and light source 25 is changed, and the line of light produced by slit 35 moves across the pixels of sensor 29. At zero degrees, pixel elements near the center of CCD sensor 29 are illuminated (see FIG. 8). As the receiver is rotated, elements farther from the center of the sensor are illuminated. (FIG. 9). The relevant alignment angle is found by determining which of the pixels of sensor 29 are illuminated and calculating how far the angle is from zero degrees. As set forth above, this is done simply by scanning the pixels to determine which ones have been illuminated. For small angles, the angle measured is approximately proportional to the distance the illuminated pixels are from those pixels which are lighted at zero degrees (the actual relationship includes an arctangent function).

FIG. 10 is a schematic block diagram of the circuitry of alignment system 1. For clarity only a single emitter/CCD sensor pair is shown, although it will be understood that each such pair if shown would function in the same manner. Each emitter 25 has an emitter driver 25A which drives the output of the emitter as described below. The output of emitter 25 passes through an optional filter 53 to fall upon mask 35 and a radiation detector 55. Filter 53 is optimized to pass only the wavelengths of light from emitter 25. Filter 53 is provided to minimize the effect of ambient light on the sensors. Radiation detector 55 is connected to head unit microprocessor 3A (or any other suitable processor). It is preferred that emitter 25 provide a relatively bright light source and that the exposure time be in the sub-millisecond or tens of microseconds range. The combination of an optical filter, bright light source, and extremely short exposure times has been found to minimize the effects of most ambient light sources and generally eliminate the need for more conventional measures, such as extra exposure cycles during which emitter 25 is not on to compensate for ambient light sources.

As shown in FIG. 10, microprocessor 3A is connected to a memory 59, and an analog-to-digital converter (ADC) 61. It is also connected to CCD sensor 29 for the purposes of activating the sensor at the appropriate time and reading (through a conventional signal conditioning circuit 63 and ADC 61 ) the sensor output.

Emitter 25 and emitter driver 25A are totally independent of microprocessor 3A and CCD sensor 29. The emitter is driven through a fixed cycle by driver 25A to provide a freewheeling or asynchronous (with respect to the microprocessor) output. The emitter output cycle consists of a modulated pulse to identify the start of the cycle, a rectangular pulse for exposure, and a differently modulated pulse for the end of the cycle, followed by a dark time equal to the exposure time. Radiation detector 55 identifies the start of the cycle and signals microprocessor 3A to turn on or activate the CCD sensor 29 for a trial exposure period. From this initial exposure, the optimum exposure time is calculated by the processor and performed on the next light cycle. An exposure of equal time is taken during the dark time of the cycle (when the emitter is off). The result from the dark time exposure is subtracted from the optimum exposure to cancel background noise. The data is then processed by microprocessor 3A and sent to console processor 3 and thereby to display 57 for display to the user.

Specifically, microprocessor 3A applies a software driven algorithm to the digitized signal from ADC 61 and therefrom determines the location of the main beam's energy peak. This energy peak is subsequently converted to an angle and displayed on display 57. Display 57 may include a CRT, a printer, or both.

By narrowing the slit 35 of mask 33, the amount of light which passes through mask 35 will be reduced, thereby reducing the number of pixels illuminated.

Because emitter 25 and detector 55 are not tied together, no feedback from the detector 29 to the emitter driver 25A is required to control exposure of the CCD sensor. No wire or communications link is needed between the sensors for the purpose of controlling the emitter. Moreover, radiation detector 55 can be used to detect over-exposure and under-exposure conditions without using the CCD sensor 29. In addition, high background signals can be detected by radiation detector 55 independent of the CCD sensor.

Figure 11:
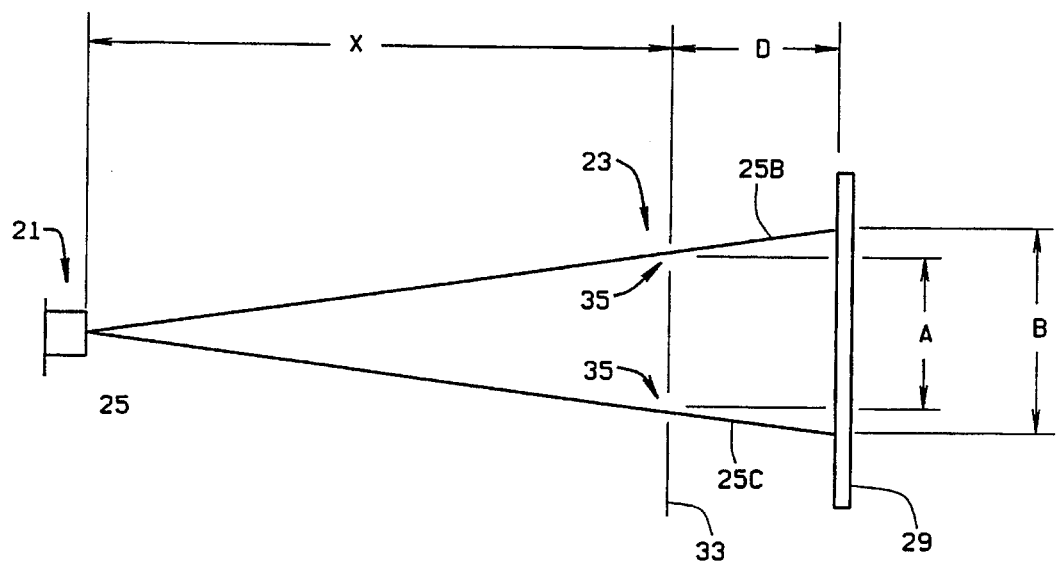
FIG. 11 is a schematic diagram illustrating the determination of vehicle wheelbase using the present invention.

Turning to FIG. 11, it can be seen how the present apparatus is used to electronically determine wheelbase. Although the present invention is described in terms of determining wheelbase, it should be understood that track width may be determined in exactly the same way except that sensor units 19 (which look across the front of the vehicle) are used instead of sensor units 21 and 23 (which look along each side of the vehicle). In general, the present invention determines the distance between sensors mounted on a vehicle, which distance may be wheelbase, or track width, or ride height, or any number of other relevant measurements, depending upon the sensors being used. In addition, system 1 as described above preferably has a mask 33 with at least three slits, but only two slits are required in the mask to determine wheelbase (or track width).

For determining wheelbase, sensor units 21 and 23 are removably mounted to their respective wheels. For simplicity, only a single pair of sensor units 21 and 23 will be considered, although it should be understood that the sensor unit pairs on each side of the vehicle operate in the same way to determine wheelbase. Any difference in the wheelbases determined by the sensor unit pairs is noted by console microprocessor 3 and indicates a potential vehicle alignment problem, such as non-parallel axles.

Note that the measurement of wheelbase requires no different mounting than that required for obtaining wheel alignment data, so that the wheelbase determination is an integral part of the wheel alignment process. It requires no additional work on the part of the technician/user. The microprocessor or controller determines the wheel alignment characteristics of the front and rear wheels from the wheel alignment data from sensor units 21 and 23 in exactly the same way as set forth above. The present apparatus is able to obtain additional information, wheelbase information, from those sensors as well. This is in part because the sensor detectors are active pixel array detectors, such as the CCD detectors described above. Actually, for purposes of determining wheelbase it is only required that one of the detectors on each side of the vehicle be an active pixel array detector, configured as shown in FIG. 11. Since the emitters and detectors come in pairs (one for each sensor unit) in the configuration described above, either pair can be used to determine wheelbase. Alternatively, both pairs can be used and the wheelbase results for each pair manipulated (by averaging, etc.) to determine the wheelbase for those two particular wheels.

As can be seen in FIG. 11, emitter 25 projects radiation (preferably infrared light, although other frequencies could also be used) in a beam toward the mask 33 and CCD detector 29. For determining wheelbase it is preferred that mask 33 have two slits 35 disposed as shown. The central slit shown in FIGS. 4 and 10, for example, may also be present, but the corresponding output of detector 29 must be ignored by the processor in that circumstance. Algorithms to perform such central peak masking in software are known in the art and do not make up part of the present invention. For clarity of illustrating the principles of determining wheelbase, only the two slits 35 necessary for this purpose are shown in FIG. 11.

Emitter 25 in combination with the two slits 35 constitute means for projecting two spatially separated images upon detector 29. In practice the result is a pair of peaks on the detector disposed where the rays 25B and 25C strike the detector. A procedure for locating those peaks using a CCD linear array detector 29 is described in U.S. Pat. No. 5,018,853, which is incorporated herein by reference. Of course many other methods of locating such peaks could also be used. The active pixel array detectors have the property that such peaks can be located, both relative to each other and relative to some arbitrary reference from the output of the detector. The output of detector 29, therefore, provides the distance "B" (the separation of the two peaks in the light distribution) to microprocessor 3A. Note that this distance changes as the distance "X" between the two sensor units change. This distance "X" is the wheelbase of the vehicle, as measured for those two particular wheels to which sensor units 21 and 23 are attached. The other two distances shown on FIG. 1, namely "D" and "A" are fixed. Distance "D" is the distance between the mask 33 and detector 29 (this distance is not shown to scale in FIG. 11). Distance "A" is the distance between the two slits 35 in the mask.

From inspection of FIG. 11, and applying the law of similar triangles, it can be seen that A/X=B/(X+D). Solving for X gives X=(A*D)/(B−A). Since A and D are known, and B is the measured separation of the peaks, the microprocessor has all the information needed to determine wheelbase.

Figure 12:
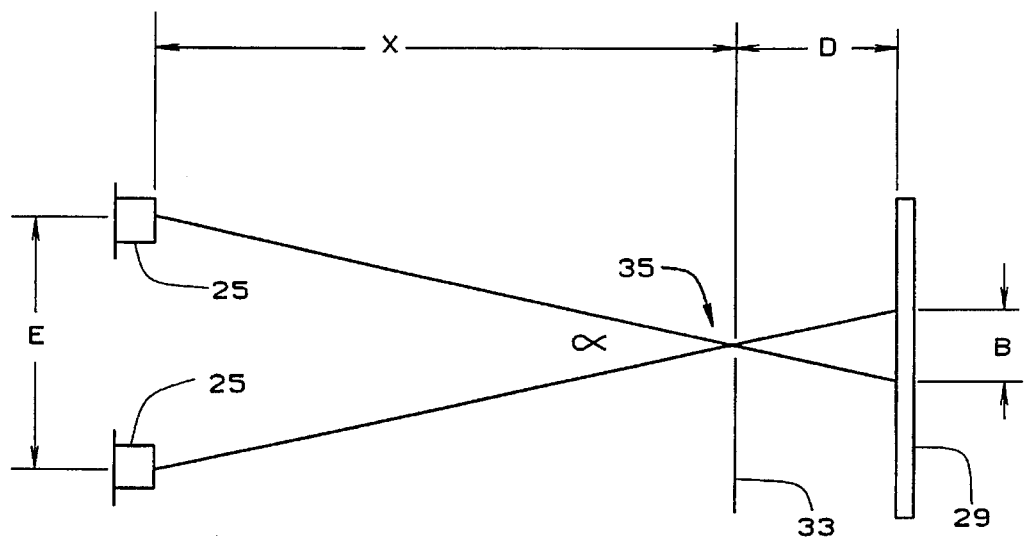
FIG. 12 is a view similar to FIG. 11 showing an alternative structure for obtaining vehicle wheelbase measurements.

Note that although a single emitter and a mask with two slits is shown for projecting a pair of radiation peaks on the detector, equivalently a pair of emitters and a mask with a single slit could be used instead. Such a configuration is shown in FIG. 12. In this configuration, the distance "E" between the emitters 25 is known, as is distance "D," while the distance "B" between the two peaks is measured. Since X/E=D/B, the wheelbase with this configuration is X=(D*E)/B. It should be realized that dimensions E and D are fixed, while dimension B varies with X. Due to manufacturing tolerances, dimension D will vary somewhat from unit to unit. This variation will cause the value of dimension B to vary from unit to unit as well. This variation can be compensated for, however, during initial calibration of the unit. During calibration, the dimensions X and E are held constant, so that the same geometrical relationship discussed above can be used to provide for a simple, automatic way of performing angular range calibration of the transducer. With dimensions E and X known and fixed during calibration, the angle between the lines of sight of each of the two emitters 25 is known to be 2*arctan(E/2X). Dimension B, the number of pixels of separation between the two peaks corresponding to the two emitters, is measured during calibration and the separation is related to the known angle α to determine range calibration of the transducer regardless of variations of other dimensions such as D.

It should be understood that using the configurations of FIGS. 11 or 12 results in an image on detector 29 having two peaks. The peaks appear at two different positions on the CCD pixel array but are centered about the true line of sight. It is preferred that the average of these two positions be determined and that the desired angle be determined from the averaged value.

Figure 13:
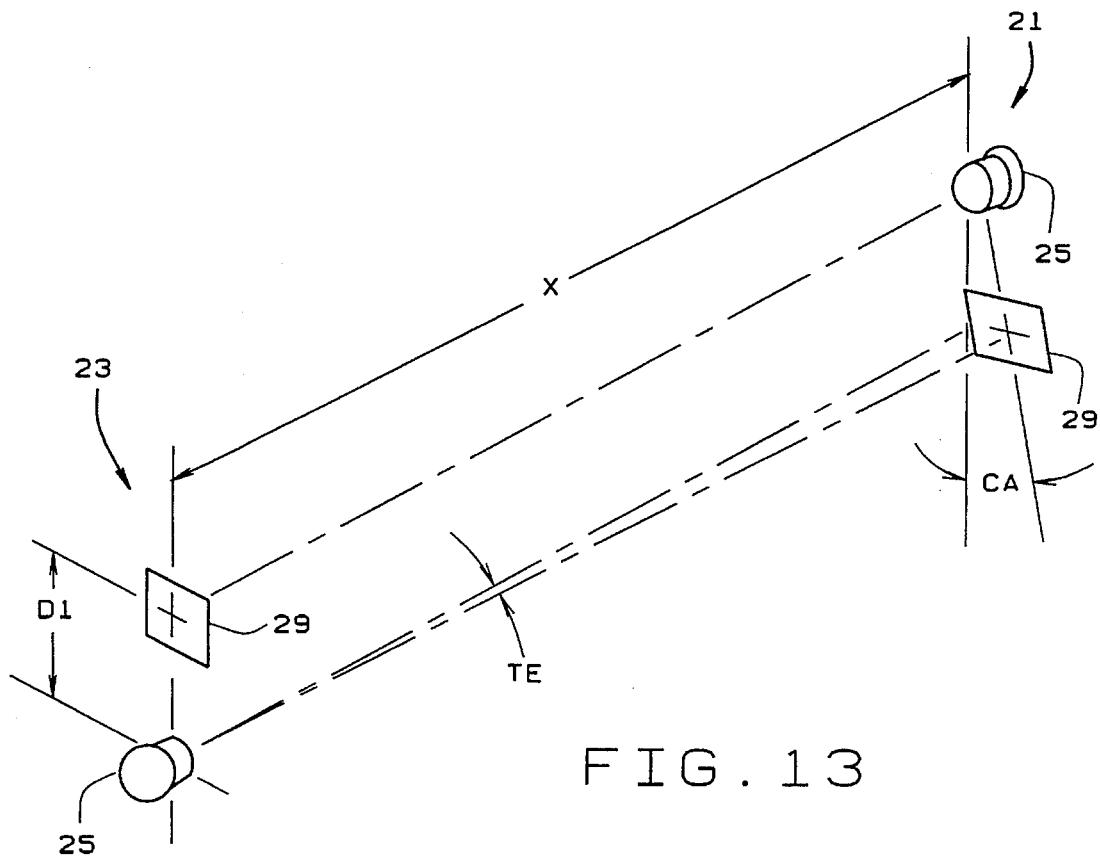
FIG. 13 is a perspective schematic illustrating an alignment measurement error whose magnitude is a function in part of wheelbase.

The electronically determined wheelbase is used by console microprocessor 3 in correcting certain alignment measurement errors which are, in part, a function of wheelbase. One such error is illustrated in FIG. 13. The measurement of rear toe of a vehicle can be affected by camber of the front wheel. This occurs because the axis of the front sensor unit 21 (which detects the rear toe angle) differs from the axis of the rear sensor unit 23 by the camber angle "CA." Note that the magnitude of the error is influenced by the fact that the front wheel detector 29 is disposed off the axis of rotation of the wheel. If both the emitter and detector were disposed on the axis of rotation of the wheel, small changes in camber would result in negligible effects on the placement of detector 29. With the configuration shown in FIG. 13, however, the error resulting from off axis placement of the front detector is small, but measurable.

As a result of the different sensor unit axes, the measured toe angle includes an error "TE" which is in part a function of the wheelbase, X (the distance between the rear wheel emitter 25 and the front wheel detector 29). The amplitude of this error is given by the equation $$\tan(TE)=(D1*\sin(CA))/X$$

where D1 is the distance between the rear emitter and detector. Since D1 is known, and the system measures CA and X, microprocessor 3 is able to use the above equation to correct the measured rear toe angle using the electronically determined wheelbase. Of course the present invention is not limited to correcting rear toe. Any wheelbase dependent error in the measurements may be corrected by microprocessor 3 once the wheelbase is determined as set forth above.

Figure 14:
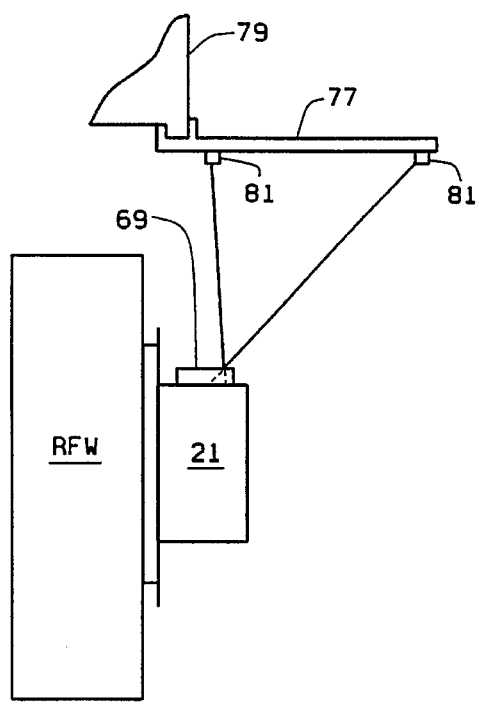
FIG. 14 is a simplified elevation of ride height and wheel offset measuring apparatus of the present invention mounted on a vehicle.
Figure 15:
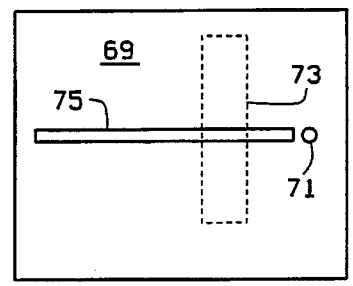
FIG. 15 is a top plan of a portion of the apparatus of FIG. 14.
Figure 16:
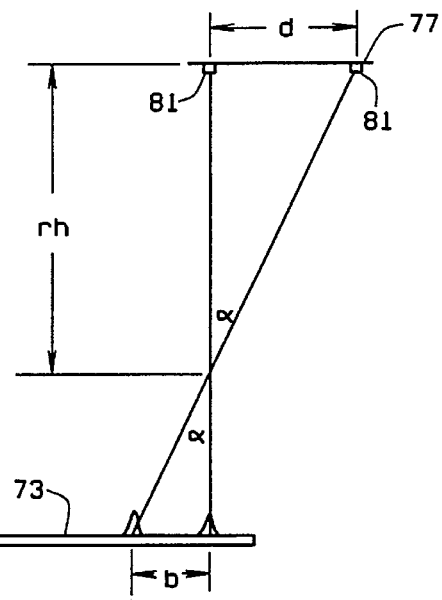
FIG. 16 is a schematic diagram illustrating the determination of ride height using the apparatus of FIG. 14.

Turning to FIG. 14, it can be seen that the present invention may also be used to determine vehicle ride height and wheel offset distances. This does require an additional piece of equipment, however. In FIG. 14, sensor unit 21 is shown removably mounted to a wheel (for purposes of illustration the right front wheel RFW). Sensor unit 21 has fixedly mounted thereto a ride height/offset sensor unit 69, which as will become apparent includes an emitter 71 (FIG. 15) and an active pixel array detector 73 (FIG. 16). More specifically, the ride height/offset sensor unit 69 has emitter 71 disposed on the top thereof, adjacent a slit 75 in the top of unit 69. The detector 73, which is preferably a linear CCD array detector, is disposed at the bottom of unit 69. Note that ride height/offset unit 69 is mounted in fixed geometrical relationship with respect to the wheel of the vehicle.

Emitter 71 is positioned so as to project illumination upwardly (as shown in FIG. 14) when sensor unit 21 is mounted on a vehicle wheel. The radiation (preferably infrared) projected by emitter 71 strikes a reflector unit 77 removably mounted by the technician/user on a fender 79 (or other suitable surface) of the vehicle. The vertical distance between ride height/offset unit 69 and reflector unit 77 is a measure of the ride height of the vehicle.

Reflector unit 77 holds in fixed known relative position a pair of corner reflective cubes 81. Such cubes are known in the art and have the property of reflecting light directed at them back at the light source along a parallel path. Radiation from emitter 71, therefore, is directed upwardly toward the corner reflective cubes 81, which reflect that radiation back downwardly through slit 75 onto CCD detector 73.

Figure 17:
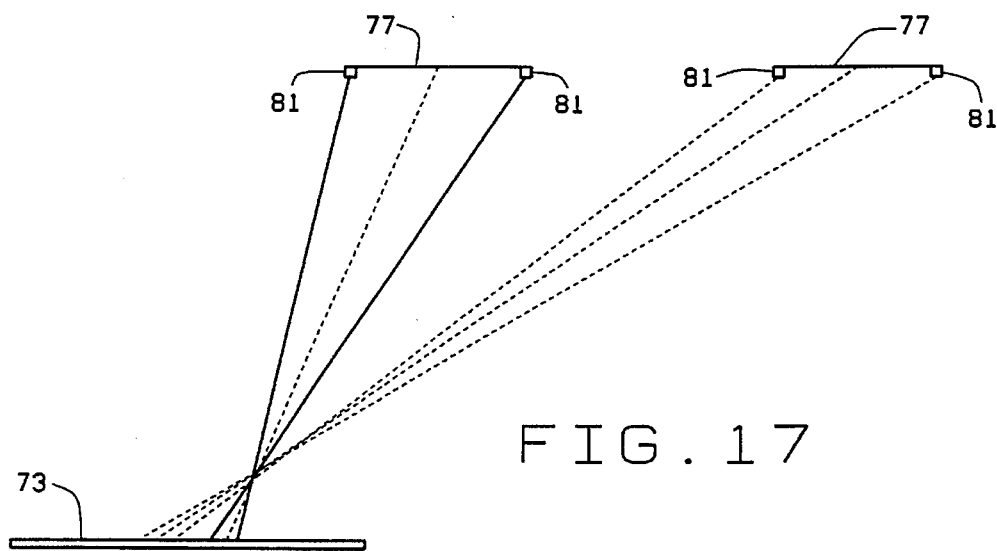
FIG. 17 is a schematic diagram illustrating the determination of wheel offset distance using the apparatus of FIG. 14.

Determination of ride height and wheel offset distance using units 69 and 77 is illustrated in FIGS. 16 and 17. In FIG. 16, the distance "rh" between slit 75 and the reflector unit is the ride height (or a distance differing from the ride height only by a known constant). The distance "d" is the spacing between the two corner reflective cubes 81 and is fixed and known. The distance "d" should be wider than the apparent separation of the emitter and the detector when viewed from the reflector.

The radiation directed by emitter 71 toward the cubes is reflected back to detector 73 where it forms the pair of separated peaks shown, which peaks in the detector output are separated by a distance "b". The distance b varies with ride height rh. This distance between peaks is determined by microprocessor 3A, to which the output of detector 73 is supplied.

Although the ride height may be determined given the peak to peak distance "b" in a number of ways, it is preferred that it be determined by using a calibration constant. Reflector unit is held by a suitable jig at a fixed, known distance, "rhcal", and at a fixed, known position with respect to detector 73. The output of detector 73 is examined by microprocessor 3 to find the calibration peak to peak distance, "bcal." Thereafter, the microprocessor determines the actual ride height by using the calibration measurement, bcal, and ride height calibration distance, rhcal, and the current peak to peak measurement, "b." The equation relating these quantities is rh=bcal * rhcal/b.

Many equivalent equations could also be used.

FIG. 17 illustrates the determination of wheel offset distance using the present apparatus. The horizontal position of reflector unit 77 with respect to the detector 73 is a measure of wheel offset distance. When the reflector unit is disposed in a position such as the leftmost one shown in FIG. 17, the reflected radiation falls on average to the right of the reflected radiation position when the reflector unit is disposed more to the right (see phantom drawing of reflector unit 77). That is, the absolute position of the radiation pattern on detector 73 is a measure of wheel offset distance. This absolute position is relatively easy to obtain since the output of the CCD detector array provides absolute position information with respect to an arbitrary reference position. The position of either peak, or the average of the positions of both peaks, or some other combination of the detector output may be used to measure wheel offset. It is preferred that microprocessor 3A determine the absolute position of each peak and then average the values to determine wheel offset, but any other method could be used as well.

During calibration, as described above, microprocessor 3A records the absolute position of the reflected radiation pattern to calibrate the wheel offset measurement. Subsequent readings of absolute position of the pattern are compared with the calibration position to determine actual wheel offset. It is preferred that the actual offset measurement be taken with the wheels steered straight ahead at the beginning of the alignment. Thereafter, reflector unit 77 may be removed by the technician/user while the rest of the alignment is performed. If it is desired to obtain continuous ride height measurements during the alignment, the reflector unit may be left in place.

Turning to the embodiment of the invention shown in FIG. 18, it is preferred that each head unit include a pair of emitters (as shown in FIG. 12), labeled 25A and 25B. Each head unit also includes a microcontroller 85 and a light modulation detector 86. The emitter systems operate in pairs, the emitter output cycle from one head unit triggering the start of the emitter output cycle from the opposite head unit. This may be seen more clearly in FIG. 19 which illustrates schematically the output of emitters 25A and 25B from one head unit, and the output of emitters 25A' and 25B' from the other head unit of that pair.

As shown in the top line A of FIG. 19, microcontroller 85 controls emitter 25A to have a modulated output for a period of time, followed by a period of time during which that emitter is on but unmodulated, followed by a period of time during which that emitter is off. At some later time, emitter 25A is modulated for a period of time that differs from the previous period of modulation and is then turned off. As shown in line B, microcontroller 85 controls emitter 25B in the same manner, starting sometime later. It is preferred that the period of time during which the output of emitter 25B is modulated differ from the modulation periods for emitter 25A. The cycle is then repeated under control of the microcontroller 85 of the first head unit.

The microcontroller 85 of the other head unit of the pair similarly controls the output of emitters 25A' and 25B' as shown on the C and D lines of FIG. 19. The modulation detector 86 on the second unit detects the modulation periods of the emitters on the first unit and the second unit microcontroller 85 in response synchronizes the emitter cycles of the second unit to those of the first unit. This insures that the emitters on opposite head units are never on at the same time.

One reason it is preferred to use a CCD array as a detector is that such a system has the capability of distinguishing direct and reflected radiation from the emitters. The principle is illustrated in FIGS. 20 and 21 with a single emitter 25, although it should be understood that systems using multiple emitters would function in substantially the same way. It is known that CCD arrays, such as detector 29, have a number of very small (0.014 mm) photo sites where the energy is received. The CCD array therefore provides a pixel-by-pixel representation of the image falling thereon. By placing a narrow slit, such as aperture 35A in FIG. 20, in front of CCD array 29 such that only a few pixels are illuminated, the angle of the incident radiation (the direct beam of radiation is labeled 89 in FIG. 20) can be determined by knowing the pixel number where the center of the energy is located. This determination involves an inverse tangent function which requires additional computer time, but which the system is well capable of computing. If a reflected beam (such as the reflected beam 91 in FIG. 20 shown reflecting off surface 93) enters aperture 35A, the pixels of array 29 which are illuminated by the reflected beam will be at a different location from the main beam pixels and will be lower in amplitude. Thus the controller analyzing the pixel-by-pixel representation of the image falling on the array may use these differences to distinguish between the direct and reflected images of the radiation source. The differences between the direct and reflected images is illustrated graphically in FIG. 20A. Thus, the system of FIG. 20 allows discrimination of the main versus the reflected beam and decreases vulnerability to stray radiation.

Even the system of FIG. 20 could be improved, however. The small receiving areas of the CCD array necessitates a narrow slit 35A in the aperture so that a well-defined peak will be formed and the center of the energy accurately determined. The narrow slit forms a good image but significantly cuts the amount of energy reaching the CCD array from emitter 25. A system configured in this way requires relatively long integration times on the CCD array or very high intensity emitters. Both of these alternatives are somewhat undesirable. The CCD array and slit arrangement is an improvement over prior devices, since it has the ability to reject reflected signals, but at the cost of a lower signal to noise ratio due to the decrease in incident energy and the small size of the detecting surface.

The system of FIG. 21 addresses these deficiencies by including a lens 95 in the system. Lens 95 concentrates the light and provides the narrow image for the CCD array, with the result that the slit, labeled 35B in FIG. 21 can be opened up to allow ample energy collection. The aperture and lens are preferably desired to work in conjunction with each other so that the image stays in focus over a wide angular range. This can be accomplished by designing the edges of the lens to have a different focal length than the central portion of the lens. The angle at which the light comes through the aperture determines which part of the lens is illuminated. Knowing which part of the lens is required to focus the light for a given incident angle allows a determination of the particular focal length which is appropriate for each particular portion of the lens. In fact, it is preferred that the lens focal length be varied so that beams entering at predetermined angles be steered to known predetermined pixels on array 29. The steering and focusing of the beam 89 by the lens 95 is preferably controlled in such a manner that the lens gives a linear relationship between the incident angle and the illuminated pixel. The inverse tangent function which in the previous embodiment is performed by a computer is, with this system, performed by the lens. With lens 95, all aspects of the system are enhanced. For example, accurate angle determination as well as reflection rejection are achieved over a wide range of angles and a large range of distances. Since the lens in effect performs calculations for the system, the computer algorithms used for angle and distance determinations are simplified. The system also has increased signal level, decreased integration time for the array 29, a sharp image over a wide angular range, and (as shown graphically in FIG. 21 A) rejection of reflected beams by discrimination of signals.

Turning to FIG. 22, a graphical representation of the method by which the present system determines toe out on turns (TOOT) is shown.. This is made possible since the sensors used in the present system are capable of determining both distance and angles. Taking advantage of this fact, it is possible to determine the translation error caused by the swinging of the front wheel sensor and to compensate for it. The particular geometry involved requires distance and angle measurements from the front sensor only, which, throughout its travel through approximately twenty (20) degrees, continues to see the beam from the corresponding rear emitter. Looking specifically at FIG. 22, origin "O" is the front wheel pivot location $\theta$ is the number of degrees turned by the front wheel of the vehicle under test, from a position at the start of the test (indicated by a line labeled "START") to a position at the end of the test (indicated by a line labeled "END"), $\alpha1$ is the transducer angle measured at the TOOT start position, R1 is the distance measured at the TOOT start position, $\alpha2$ is the transducer angle measured at the TOOT end position, and R2 is the distance measured at the TOOT end position.

The triangle defined by the points ODE in FIG. 22 has two equal sides of length S (length S being the swing radius of the sensor). Therefore, the angles A1 and B2 opposite these sides are equal. Since the interior angles of a triangle sum to 180 degrees, $$\theta + A1 + B2 = 180.$$

Substituting for B2 and rearranging terms gives $$A1 = (180 - \theta)/2.$$

Similarly, the other angles are determined as follows:
A2:

$$A2 = 90 - A1$$

$$A2 = 90 - (180 - \theta)/2 = \theta/2.$$

A3:

$$A3 = \alpha2 - A2$$

$$A3 = \alpha2 - \theta/2.$$

B1:

$$B1 = 90 - \alpha1.$$

B3:

$$B3 = B1 + B2$$

$$B3 = 90 - \alpha1 + (180 - \theta)/2$$

$$B3 = 180 - (\alpha + \theta/2).$$

Using the law of sines:

$$\frac{R1}{\text{SIN}(A3)} = \frac{R2}{\text{SIN}(B3)}$$

$$\frac{R1}{\text{SIN}\left(\alpha2 - \frac{\theta}{2}\right)} = \frac{R2}{\text{SIN}\left(180 - \left(\alpha1 + \frac{\theta}{2}\right)\right)}$$

Using the identity $SIN(X)=SIN(180-X)$, $$\frac{R1}{SIN\left(\alpha 2 - \frac{\theta}{2}\right)} = \frac{R2}{SIN\left(\alpha 1 + \frac{\theta}{2}\right)}$$

This equation has only a single unknown, the angle $\theta$, which is the desired steered angle. The system, therefore, solves for the desired unknown as follows:
Using the identities:

$$SIN(X \pm Y) = SIN(X)COS(Y) \pm COS(X)SIN(Y)$$

and rewriting $$\frac{R1}{SIN(\alpha 2)COS(\theta/2) - COS(\alpha 2)SIN(\theta/2)} =$$

$$\frac{R2}{SIN(\alpha 1)COS(\theta/2) + COS(\alpha 1)SIN(\theta/2)}$$

$(R2)SIN(\alpha 2)COS(\theta/2) - (R2)COS(\alpha 2)SIN(\theta/2) =$ $\qquad (R1)SIN(\alpha 1)COS(\theta/2) + (R1)COS(\alpha 1)SIN(\theta/2)$ $(R2)SIN(\alpha 2)COS(\theta/2) - (R1)SIN(\alpha 1)COS(\theta/2) =$ $\qquad (R2)COS(\alpha 2)SIN(\theta/2) + (R1)COS(\alpha 1)SIN(\theta/2)$ $[(R2)SIN(\alpha 2) - (R1)SIN(\alpha 1)]COS(\theta/2) =$ $\qquad [(R2)COS(\alpha 2) + (R1)COS(\alpha 1)]SIN(\theta/2)$ $$\frac{(R2)SIN(\alpha 2) - (R1)SIN(\alpha 1)}{(R2)COS(\alpha 2) + (R1)COS(\alpha 1)} = \frac{SIN(\theta/2)}{COS(\theta/2)}$$

$$\theta = 2TAN^{-1}\left[\frac{(R2)SIN(\alpha 2) - (R1)SIN(\alpha 1)}{(R2)COS(\alpha 2) + (R1)COS(\alpha 1)}\right]$$

The system solves this equation to obtain the desired angle from known quantities.

In addition, the equations can also be used to solve for the swing radius as follows:
Determination of Angles 1. $C1 = 90 - \alpha 1$
2. $C2 = 90 - \alpha 2$
3. $C3 = C2 + \theta - C1$
   $C3 = 90 - \alpha 2 + \theta - (90 - \alpha 1)$
   $C3 = \theta + \alpha 1 - \alpha 2$ where C1, C2 and C3 are shown reference to an origin defined by the optical center line OCL and the rear axle RA of the vehicle.
Using the law of sines again, $$\frac{ED}{SIN(\theta + \alpha 1 - \alpha 2)} = \frac{R1}{SIN\left(\alpha 2 - \frac{\theta}{2}\right)}$$

$$ED = \frac{(R1)SIN(\theta + \alpha 1 - \alpha 2)}{SIN\left(\alpha 2 - \frac{\theta}{2}\right)}$$

Further, $$(S)SIN\left(\frac{\theta}{2}\right) = \frac{ED}{2}$$

$$S = \frac{ED}{2SIN\left(\frac{\theta}{2}\right)}$$

Thus, the swing radius can also be determined by the present system using only the front sensor measurements.

The foregoing description has been set forth for illustrative purposes only. Variations, within the scope of the appended claims, may be apparent to those skilled in the art.

What is claimed is:

1. In a method of electronically determining distances in connection with servicing of a vehicle, the method of calibrating a sensor comprising:

fixing a sensor at a first known distance from a pair of radiation sources, said pair of radiation sources being separated by a second known distance from each other, said sensor having an image detector mounted a fixed distance behind an image forming element;

causing images from the pair of radiation sources to fall upon the image detector;

measuring the spatial separation on the image detector of the images created by the pair of radiation sources;

determining from said spatial separation and the known first and second distances a calibration factor for the sensor.

2. The method of electronically determining distances in connection with servicing of a vehicle as set forth in claim 1, further including the steps of:

mounting said sensor at a first position on a vehicle;

mounting a second pair of radiation sources at a second position on said vehicle, said second pair of radiation sources being separated from each other by a known distance;

causing radiation from said second pair of radiation sources to create a pair of images on the image detector of the sensor;

measuring the spatial separation on the image detector of the images created by said second pair of radiation sources; and determining the distance between the first and second positions on the vehicle using the spatial separation of the images of said second pair of radiation sources and the calibration factor.

3. The method as set forth in claim 1 wherein the image detector is divided into pixels and the spatial separation of the images on the detector is determined by evaluating the number of pixels between the peaks of the images on the detector.

4. The method as set forth in claim 3 wherein the image detector is a CCD detector.

5. The method as set forth in claim 2 wherein the sensor is mounted with respect to a first wheel of the vehicle and the radiation sources are mounted with respect to a second wheel of the vehicle and the distance measured corresponds to wheelbase.

6. The method as set forth in claim 2 wherein the sensor is mounted with respect to one wheel of the vehicle and the radiation sources are mounted with respect to another wheel of the vehicle and the distance measured corresponds to track width.

7. A vehicle wheel aligner comprising:

a first unit for attachment to a first wheel of a vehicle;

a second unit for attachment to a second wheel of a vehicle;

at least a pair of radiation sources mounted on the first unit for providing a pair of radiation signals;

an image detector mounted on the second unit for receiving an image from the radiation sources and for producing an .output in response to the radiation signal, said image having a pair of peaks corresponding to the pair of radiation sources, said image detector including a pixel array, the pixels in the array accumulating charges in response to radiation from the radiation sources falling thereon;

means for reading the charges in the pixels of the array to form a numerical representation of the radiation falling on the pixel array;

a controller for analyzing the numerical representation of the radiation falling on the pixel array to determine the true line of sight from the image detector to the radiation sources to determine vehicle alignment information for the vehicle.

8. The vehicle wheel aligner as set forth in claim 7 wherein the controller includes means for averaging the positions of the pair of peaks to determine the true line of sight.

9. A vehicle wheel aligner comprising:

a first unit for attachment to a first wheel of a vehicle, said first unit including a first pair of radiation emitters and a first modulation detector;

a second unit for attachment to a second wheel of a vehicle, said second unit including a second pair of radiation emitters and a second modulation detector;

said first modulation detector detecting modulation in the radiation from the second pair of radiation emitters, and the second modulation detector detecting modulation in the radiation from the first pair of radiation emitters;

a first image detector mounted on the first unit for receiving an image from the radiation emitters of the second unit;

a second image detector mounted on the second unit for receiving an image from the radiation emitters of the first unit;

a first synchronizing controller operatively connected to the first modulation detector for synchronizing the output of the first pair of radiation emitters so that said first pair of radiation emitters emit radiation only during periods of time when the second pair of radiation emitters are not emitting radiation;

means responsive to the image received by at least one of the image detectors to determine vehicle alignment information for the vehicle.

10. The vehicle wheel aligner as set forth in claim 9 further including a second synchronizing controller operatively connected to the second modulation detector for synchronizing the output of the second pair of radiation emitters so that said second pair of radiation emitters emit radiation only during periods of time when the first pair of radiation emitters are not emitting radiation.

11. The vehicle wheel aligner as set forth in claim 9 wherein the first synchronizing controller is responsive to the detection of a predetermined emitter output pattern from the second unit to commence an emitter output cycle from the first unit.

12. The vehicle wheel aligner as set forth in claim 11 wherein the predetermined emitter output pattern includes a modulated radiation signal followed by an unmodulated radiation signal.

13. The vehicle wheel aligner as set forth in claim 12 wherein the unmodulated radiation signal in the predetermined emitter output pattern is followed by the absence of any radiation signal.

14. The vehicle wheel aligner as set forth in claim 13 wherein the absence of any radiation signal in the predetermined emitter output pattern is followed by a modulated radiation signal which differs in period from the first modulated radiation signal of the pattern.

15. A method of electronically determining distance between a pair of sensors mounted in known relationships to a vehicle comprising:

projecting a pair of images upon an image detector, said images being separated such that the separation is a function of the distance between the pair of sensors; and electronically determining the separation of the images and calculating therefrom said distance between said pair of sensors.

* * * * *